A. B. STITZER.
ELECTRIC CAR CONTROLLING SYSTEM.
APPLICATION FILED AUG. 2, 1909.
941,391.
Patented Nov. 30, 1909.
3 SHEETS—SHEET 1.
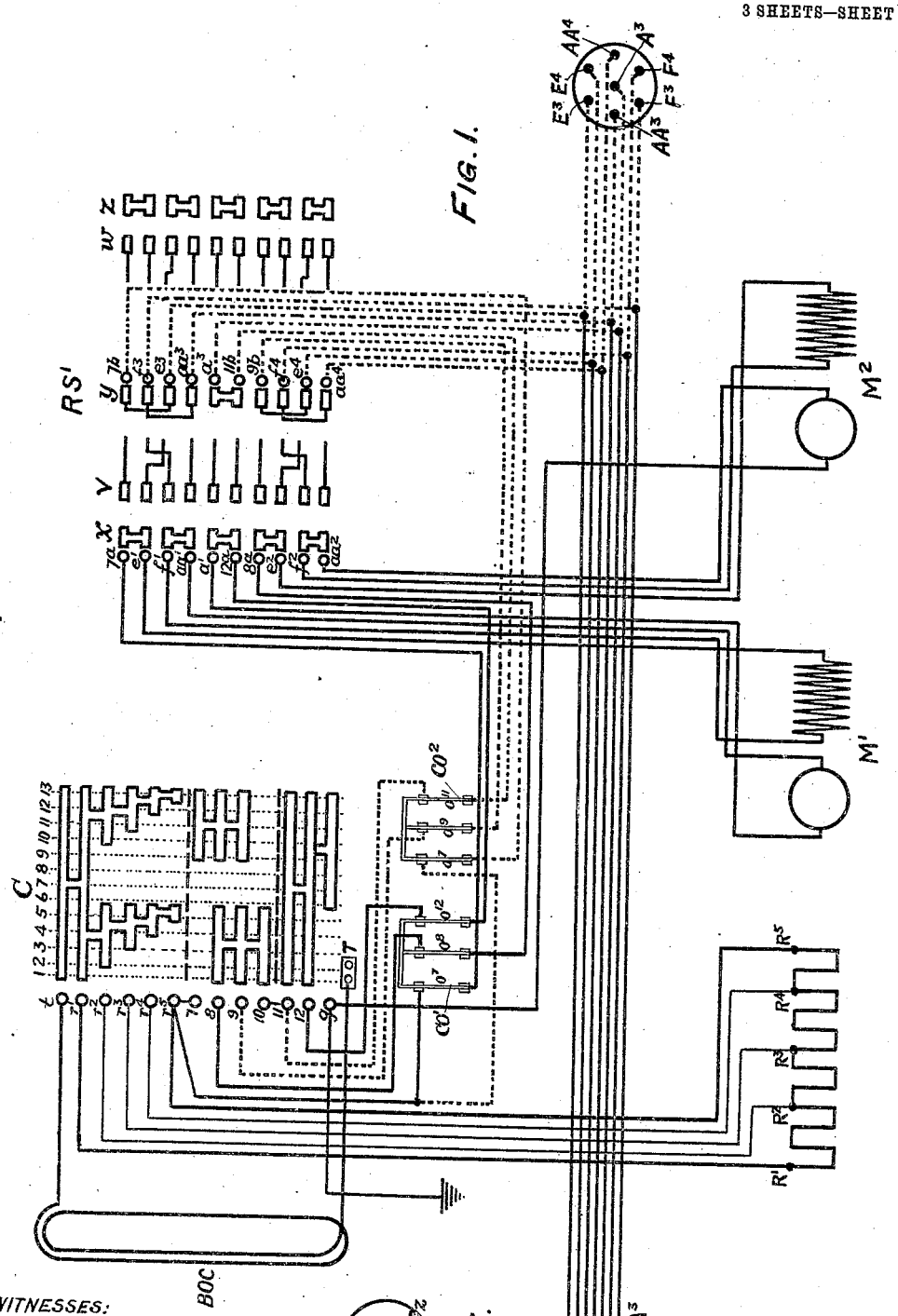
WITNESSES:
INVENTOR
Arthur B Stitzer
BY
Harding & Harding
ATTORNEYS.

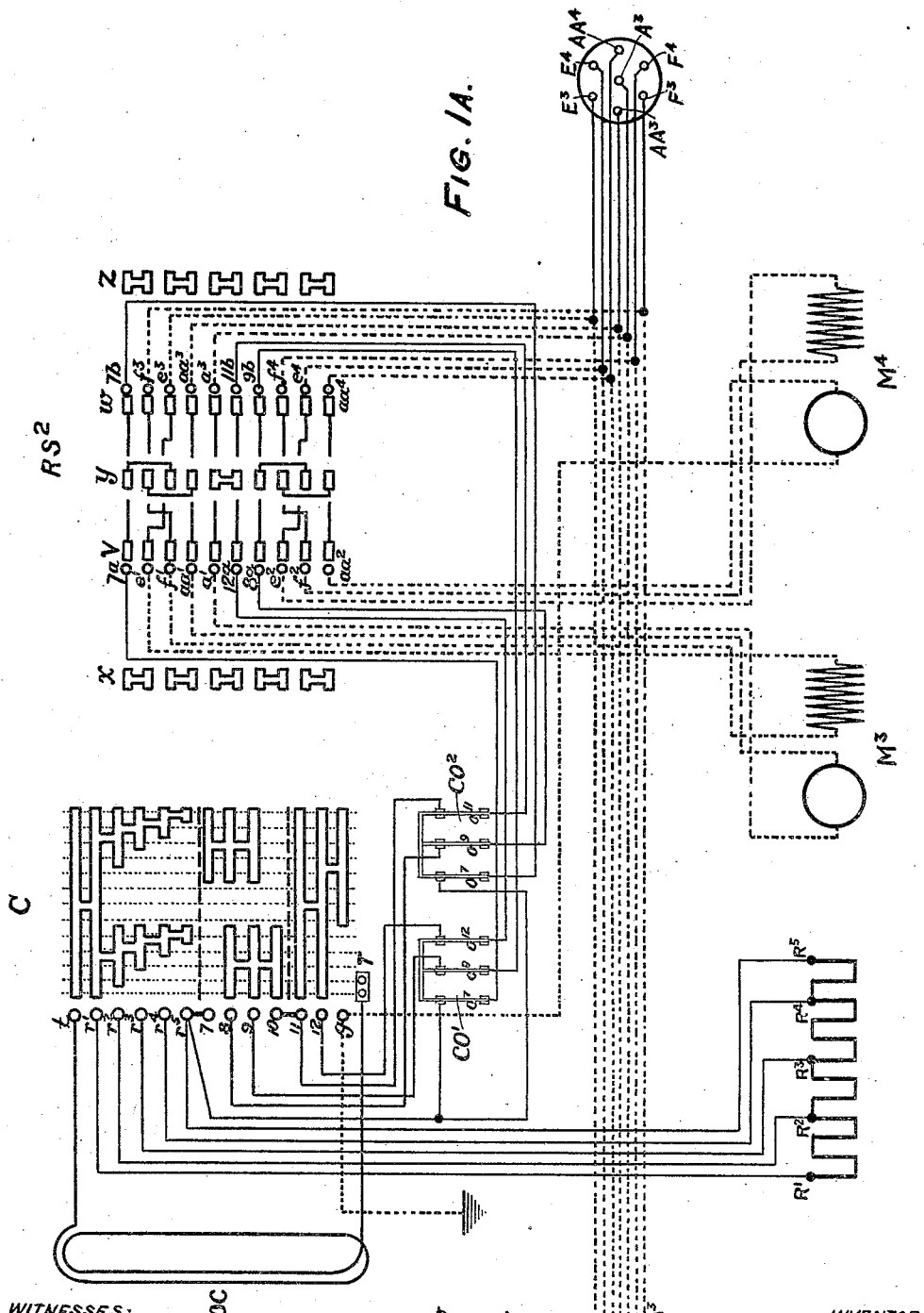

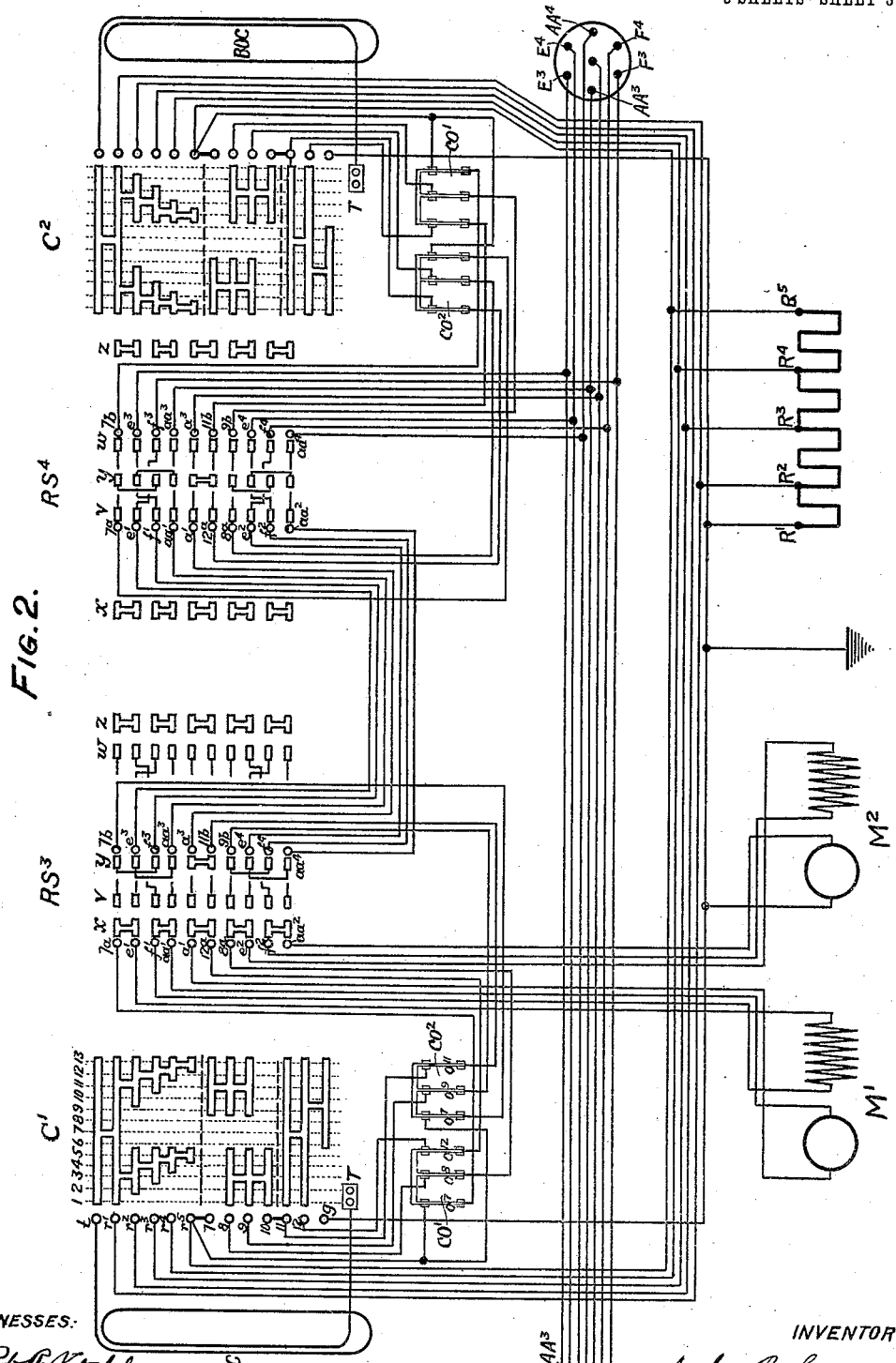

UNITED STATES PATENT OFFICE.

ARTHUR B. STITZER, OF PHILADELPHIA, PENNSYLVANIA.

ELECTRIC CAR-CONTROLLING SYSTEM.

941,391. Specification of Letters Patent. Patented Nov. 30, 1909.

Continuation of application Serial No. 493,132, filed April 30, 1909. This application filed August 2, 1909.
Serial No. 510,875.

*To all whom it may concern:*

Be it known that I, ARTHUR B. STITZER, a citizen of the United States, residing at Philadelphia, county of Philadelphia, and State of Pennsylvania, have invented a new and useful Improvement in Electric Car-Controlling Systems, of which the following is a full, clear, and exact description, reference being had to the accompanying drawings, which form a part of this specification.

The object of my invention is to enable two cars, adapted normally to be operated as units, to be coupled together and operated from a single controller on either of the cars.

It has long been customary to attach to a "motor-car" a "trailer" that is not equipped with motors; but in this arrangement, the motor-car must be equipped with motors of sufficient power or number to propel both cars, thus more or less unfitting the motor-car for use as a single unit. In modern systems, however, conditions arise that render it advantageous to operate cars as either single or double units. For example, during the "rush" hours, or in times of great temporary increase of passenger traffic, it becomes desirable to substantially increase the carrying capacity, although it may be inexpedient to correspondingly increase the working force. This result would be secured if the ordinary motor-cars could be coupled together and operated from a single controller.

My invention involves a modification of the ordinary controlling apparatus and of the connection therefrom to the motor, whereby this capacity may be attained. I herein disclose two embodiments of the invention, one in which the cars adapted to be coupled together are each provided with a single controller at one end of the car and the other in which the cars adapted to be coupled together are each provided with two controllers at opposite ends of the car. In each embodiment, I have shown two motors to a car, although it is obvious that the invention is applicable to a car propelled by a single motor or to a car propelled by more than two motors, such application involving merely a simplification, on the one hand, or an amplification, on the other hand, of the two-motor system.

In the drawings, Figures 1 and 1$^A$ each represents a car wiring diagram of a single-ended car embodying my invention, the two figures being in all respects duplicates except that different portions of the wiring are differently indicated to represent the flow of the current when the cars of the two figures are coupled together and operated from the controller of the car of Fig. 1. Fig. 2 is a car wiring diagram of a double-ended car embodying my invention. Figs. 3 and 4 are diagrams in cross-section of the reversers of Figs. 1 and 1$^A$ respectively.

Referring first to Fig. 1, C represents the controller or regulator and RS′ the reversing switch, contituting the controlling means for a "single-end" car. M′ and M$^2$ represent the motors of a two-motor car. CO′ represents the cut-out switch for the two motors M′ and M$^2$. CO$^2$ represents the cut-out switch for the two motors of another car, as, for example, the motors M$^3$ and M$^4$ of the car of Fig. 1$^A$, as will be hereinafter explained. R′ to R$^5$ inclusive represents the resistances, and BOC the blow-out coil. E$^3$, F$^3$, AA$^3$, A$^3$, E$^4$, F$^4$, AA$^4$, represent groups of terminal contacts constituting two circuit couplings located at opposite ends of the car. The several contacts of either circuit coupling are adapted to respectively engage corresponding contacts of a similar group at the end of another similar car, as, for example, the car of Fig. 1$^A$. Corresponding terminal contacts of the groups at opposite ends of a car are respectively connected together.

The controller does not differ in principle of construction from the ordinary controller but differs in detail with respect to the connections therefrom to the reverser and motors, as hereinafter explained. The several running and transition positions assumed by the rotatable drum of the controller are indicated by the reference numerals 1 to 13 inclusive. The fixed brushes of the controller are marked respectively $t$, $r'$ to $r^5$ inclusive, 7 to 12 inclusive and $g$. The brush or current supply contact $t$ is connected with the trolley T through the blow-out coil BOC. The brushes $r$, to $r^5$ are respectively connected with the resistances R′ to R$^5$. The brush $g$, which connects with ground, is also connected with one pole of the armature of motor M$^2$. The brush 7 is permanently connected with the brush $r^5$. The brushes $r^5$ and 7 are connected in parallel with the member $o^7$ of the cut-out switch CO′ and the member $o^7$ of the cut-out switch CO². The brush 8 is connected with the member $o^8$ of the cut-out switch CO′. The brush 9 is connected with the member $o^9$ of the cut-out switch CO². The brushes 10 and 11 are permanently connected together and are connected with the member $o^{11}$ of the cut-out switch CO². The brush 12 is connected with the member $o^{12}$ of the cut-out switch CO′.

The reversing switch comprises, as usual, two series of fixed brushes, and three series of contacts $x$, $y$, $z$, on the rotatable drum. The fixed brushes of the left-hand series are lettered $7^a$, $e'$, $f'$, $aa'$, $a'$, $12^a$, $8^a$, $e^2$, $f^2$, $aa^2$, and the fixed brushes of the right-hand series are lettered $7^b$, $f^3$, $e^3$, $aa^3$, $a^3$, $11^b$, $9^b$, $f^4$, $e^4$, $aa^4$. When the reverser is moved to its "forward" position, which is the one indicated in Fig. 1, the contacts $x$ engage respectively the fixed brushes of the left-hand series, and the intermediate contacts $y$ engage the fixed brushes of the right-hand series. When the reverser is moved to the "reverse" or "back" position, the contacts $y$ engage respectively the fixed brushes of the left-hand series, and the contacts $z$ engage the fixed brushes of the right-hand series.

In addition to the usual contacts carried by the reversing drum, it also carries the two series of contacts $v$ and $w$, which are adapted, when the reversing switch is at its intermediate or "off" position, as indicated in Fig. 1ᴬ, to respectively contact with brushes of the two series. The contacts $v$ are respectively connected with the contacts $w$, so that when the reverser is at its intermediate position, the brushes of the two series are respectively connected with each other in the manner indicated in the drawings, while they are disconnected from each other when the reverser is moved to either its forward or reverse positions.

Returning now to the fixed brushes of the reverser RS′, the connections from the several brushes of the left-hand series will now be described. The first brush $7^a$ is connected with the member $o^7$ of the cut-out switch CO′, which in turn is connected with the fixed brush 7 of the controller, as before described. The second and third brushes $e'$ and $f'$ are respectively connected with opposite poles of the field of motor M′. The fourth and fifth brushes $aa'$ and $a'$ are respectively connected with the opposite poles of the armature of motor M′. The sixth brush $12^a$ is connected with the fixed brush 12 of the controller through the member $o^{12}$ of the cut-out switch CO′. The seventh brush $8^a$ is connected with the fixed brush 8 of the controller through the member $o^8$ of the cut-out switch CO′. The eighth and ninth brushes $e^2$ and $f^2$ are connected respectively with opposite poles of the field of motor M². The tenth brush $aa^2$ is connected with one pole of the armature of motor M², the other pole of which, as before stated, connects with the brush $g$ of the controller.

Referring now to the connections from the right-hand series of fixed brushes of the reversers RS′, the first brush $7^b$ is connected with the member $o^7$ of the cut-out switch CO², which in turn is connected with the fixed brush 7 of the controller, as before described. The second and third brushes $f^3$ and $e^3$ are respectively connected with the terminal contacts F³ and E³. The fourth and fifth brushes $aa^3$ and $a^3$ are respectively connected with the terminal contacts AA³ and A³. The sixth brush $11^b$ is connected with the fixed brush 11 of the controller through the member $o^{11}$ of the cut-out switch CO². The seventh brush $9^b$ is connected with the fixed brush 9 of the controller through the member $o^9$ of the cut-out switch CO². The eighth and ninth brushes $f^4$ and $e^4$ are connected respectively with the terminal contacts F⁴ and E⁴. The tenth brush $aa^4$ is connected with the terminal contact AA⁴. Each series of fixed reverser brushes therefore include a set of brushes $7^a$, $12^a$ and $8^a$, or $7^b$, $11^b$ and $9^b$, connected to the controller brushes, and a set, comprising the remaining brushes of the series, connected with the motor elements or with the terminal contacts. While all of the contacts $v$ and $w$ on the reversing drum are shown as connected together, the connections between such of the contacts $v$ and $w$ as connect brushes $7^a$, $12^a$ and $8^a$, or $7^b$, $11^b$ and $9^b$, connected with the controller may be omitted.

The construction and arrangement of the propelling and controlling means, and the wiring, are the same in Fig. 1ᴬ as in Fig. 1, and the same reference characters are applied thereto, with the exception that the motors are marked M³ and M⁴, the cut-out switches CO³ and CO⁴, and the reverser RS².

In describing the operation of my invention, it will be assumed that the cars of Figs. 1 and 1ᴬ, hereinafter referred to as the first and second cars, are coupled together and the motors of both cars controlled from the controller of the first car. Under this assumption, the reverser of car No. 1 will have been moved to its forward position, just as when car No. 1 is being operated singly, and the controller and reverser of car No. 2 will have been moved to their "off" positions. It will also be assumed that the controller of car No. 1 has been moved to its first position, which is the position at which the resistances are all in circuit and the motors of each car are connected in series. To enable the course of the current to be traced with more facility, the wires through which, in this running position, the current passes to the motors of the first car are indicated by heavy full lines, those through which current passes to the motors of the second car by heavy dotted lines, and those through which no current passes by light full lines.

The current passes from the trolley T, through the blow-out coil BOC to brush $t$, through contact plates on the controller drum to brush $r'$, through the resistances $R'$ to $R^5$ to brushes $r^5$ and 7. Thence the current divides and passes through the motors of the two cars in multiple. The course of the current through the motors of the first car will be first traced. From brushes $r^5$ and 7, the current passes through the member $o^7$ of the cut-out switch CO', thence to the brush $7^a$ of the reverser RS', to brush $e'$, through the field of motor M', to brush $f'$, to brush $aa'$, through the armature of motor M', to brush $a'$, to contact $12^a$, to the member $o^{12}$ of cut-out switch CO', to brush 12 of the controller, through contact-plates of the controller drum to brush 11, to brush 10, through contact-plates of the controller drum to brush 8, through the member $o^8$ of the cut-out switch CO' to brush $8^a$ of the reverser RS', to brush $e^2$, through the field of motor $M^2$ to brush $f^2$, to brush $aa^2$, through the armature of motor $M^2$ to brush $g$ of the controller, and thence to ground. Tracing now the course of the current through the motors of the second car and starting from the brushes $r^5$ and 7, whence the current divides, as before described: the current passes through the member $o^7$ of the cut-out switch $CO^2$, thence to brush $7^b$ of the reverser RS' of the first car, to brush $e^3$ of reverser RS', to the terminal contact $E^3$, to brush $e^3$ of the reverser $RS^2$ of the second car, to brush $e'$ of reverser $RS^2$, through the field of motor $M^3$, to brush $f'$ of reverser $RS^2$, to brush $f^3$ of reverser $RS^2$, to terminal contact $F^3$, to brush $f^3$ of reverser RS', to brush $aa^3$ of reverser RS', to terminal contact $AA^3$, to brush $aa^3$ of reverser $RS^2$, to brush $aa'$ of reverser $RS^2$, through the armature of motor $M^3$, to brush $a'$ of reverser $RS^2$, to brush $a^3$ of reverser $RS^2$, to terminal contact $A^3$, to brush $a^3$ of reverser RS', to brush $11^b$ of reverser RS', through the member $o^{11}$ of cut-out switch $CO^2$ to brush 11 of the controller, through contact plates of the controller drum to brush 9 of the controller, through the member $o^9$ of cut-out switch $CO^2$ to brush $9^b$ of reverser RS', to brush $e^4$ of reverser RS', to terminal contact $E^4$, to brush $e^4$ of reverser $RS^2$, to brush $e^2$ of reverser $RS^2$, through the field of motor $M^4$ to brush $f^2$ of reverser $RS^2$, to brush $f^4$ of reverser $RS^2$, to terminal contact $F^4$, to brush $f^4$ of reverser RS', to brush $aa^4$ of reverser RS', to terminal contact $AA^4$, to brush $aa^4$ of reverser $RS^2$, to brush $aa^2$ of reverser $RS^2$, through the armature of motor $M^4$, to brush $g$ of the controller of the second car, and thence to ground.

It is unnecessary to trace the course of the current through the motors of the two cars in the several running positions of the controller. It is sufficient to say that in the next four running positions the course of the current is the same except that the resistances are more or less cut out; that in transition positions 6, 7 and 8, motors $M^2$ and $M^4$ are cut out, and that in the remaining running positions, in which the resistances are more or less cut out, the current passes through the four motors in parallel. Thus the method of regulation corresponds to that of an ordinary four-motor car.

If the reverser RS' is moved to the "back" position, the course of the current will be the same, except that it will flow through one of the elements of each motor in a direction opposite to that hereinbefore described.

Hereinbefore it has been assumed that one end (say the front) of the second car has abutted against the rear of the first car. Obviously, if the rear of the second car abuts against the rear of the first car, and the current should flow through the motors of the second car as before described, the second car would tend to run backwardly. This, however, is not the case, as when the rear of the second car abuts against the rear of the first car, the current is reversed through the fields of both motors, causing the second car to run "forwardly" with respect to the first car. The reason for this can be readily understood if Sheet 2 of the drawings be turned "up-side-down" and abutted against Sheet 1, and the adjacent set of terminal contacts be supposed to be abutted against each other. The terminal contacts of the first car will then register with the terminal contacts of the second car as follows: $E^3$, $E^4$, $AA^4$, $A^3$, $AA^3$, $F^3$, $F^4$ will respectively contact with $F^3$, $F^4$, $AA^4$, $A^3$, $AA^3$, $E^3$, $E^4$. This will cause the current to be reversed in the fields of motors $M^3$ and $M^4$. For example, the current from $e^3$ of reverser RS' passes to terminal contact $E^3$ of car 1, thence to terminal contact $F^3$ of car 2, thence successively to brushes $f^3$ and $f'$ of reverser $RS^2$, thence through the field of motor $M^3$ in the direction the reverse of that hereinbefore described, thence successively to brushes $e'$ and $e^3$ of reverser $RS^2$, thence to terminal contact $E^3$ of car 2, thence to terminal contact $F^3$ of car 1, and thence to brush $f^3$ of reverser RS'. It will therefore be understood that whether the front or rear of car 1 is abutted against the front or rear of car 2, the current flowing through the motors of both cars will tend to propel them in the same direction.

In Fig. $1^A$ the connections between the cut-out switches and the controller are modified in that the blade $o^8$ of CO' is connected to brush $9^b$ of the reverser and the blade $o^9$ of $CO^2$ is connected to brush $8^a$ of the reverser. In this alternative arrangement, each cut-out switch is adapted to cut out one motor of each car instead of both motors of one car.

In Fig. 2 is shown the application of my invention to a "double-end" car, which is provided with a controller and reverser at each end. The same reference letters are applied to the parts shown as are applied to the corresponding parts of Fig. 1 except that the reversing switches are lettered $RS^3$ and $RS^4$ and the controllers or regulators are lettered $C'$ and $C^2$. The arrangement of the two series of fixed brushes of each of the reversers $RS^3$ and $RS^4$ is the same as in the reverser $RS'$ of Fig. 1 except that in $RS^3$ and $RS^4$ the positions of the brushes $e^3$ and $f^3$ and of brushes $e^4$ and $f^4$ are the reverse of those shown in Fig. 1 and when the reverser is in its intermediate position brush $e'$ is connected with $f^3$, $f'$ with $e^3$, $e^2$ with $f^4$ and $f^2$ with $e^4$. The connections from the controller $C'$ through the reversing switch $RS^3$ and cut-out switch $CO'$ to the motors $M'$ and $M^2$ are, as shown, the same as in Fig. 1, although it will be understood that they may be changed to correspond to the connections shown in Fig. 1A. The connections from the controller $C'$ to the brushes $7^b$, $11^b$ and $9^b$ of reverser $RS^3$ through the cut-out switch $CO^2$ are also the same as in Fig. 1. The connections from controller $C^2$ to the brushes $7^b$, $11^b$, and $9^b$ of reverser $RS^4$ are the same as in the connections from controller $C'$ to the corresponding brushes of reverser $RS^3$. The connections from controller $C^2$ to the brushes $7^a$, $12^a$ and $8^a$ of reverser $RS^4$ are the same as the connections from controller $C'$ to the corresponding brushes of reverser $RS^3$. The connections from the brushes $e^3$, $f^3$, $aa^3$, $a^3$, $e^4$, $f^4$, and $aa^4$ of reverser $RS^4$ to the terminal contacts $E^3$, $F^3$, $AA^3$, $A^3$, $E^4$, $F^4$ and $AA^4$ are the same as the connections from the corresponding brushes of reverser $RS'$ to the corresponding terminal contacts in Fig. 1. The brushes $e^3$, $f^3$, $aa^3$, $a^3$, $e^4$, $f^4$ and $aa^4$ of reverser $RS^3$ are connected respectively to the brushes $e'$, $f'$, $aa'$, $a'$, $e^2$, $f^2$ and $aa^2$ of reverser $RS^4$.

Assuming that two cars, each equipped in accordance with the diagram Fig. 2, are coupled together, and operated from controller $C'$, which is moved to the first running position, the current passing from brushes $r^5$ and 7 will pass through the motors of the first car as hereinbefore described in connection with the description of the operation of the single-end car. The parallel circuit through the motors of the second car will pass to brushes $7^b$ and $f^3$ of reverser $RS^3$, thence to and across the reverser $RS^4$, thence through terminal contacts and across both reversers of the second car, thence through the field of the first motor of the second car, thence across both reversers of the second car, thence through terminal contacts and across the reverser $RS^4$ of the first car, thence to brushes $e^3$ and $aa^3$ of reverser $RS^3$, thence across reverser $RS^4$, thence through terminal contacts and across both reversers of the second car, thence through the armature of the first motor of the second car, thence across both reversers of the second car, thence through terminal contacts and across the reverser $RS^4$ of the first car, thence to brushes $a^3$ and $11^b$ of reverser $RS^3$, thence to brushes 11, 10 and 9 of the controller, thence to brushes $9^b$ and $f^4$ of reverser $RS^3$, thence across reverser $RS^4$, thence through terminal contacts and across both reversers of the second car, thence through the field of the second motor of the second car, thence across both reversers of the second car, thence through terminal contacts and across the reverser $RS^4$ of the first car, thence to brushes $e^4$ and $aa^4$ of reverser $RS^3$, thence across reverser $RS^4$, thence through terminal contacts and across both reversers of the second car, thence through the armature of the second motor of the second car, and thence to ground.

From the foregoing description it will be understood that both cars may be operated from either end of either car in precisely the manner in which either car is operated singly; and that the four motors of the two cars are operated in the same manner as are the four motors of the single four-motor car. When the car is operated as a single car, the course of the current through the motors $M'$ and $M^2$ will be the same as hereinbefore described if the controller $C'$ is operated; but if the controller $C^2$ is operated, the current from the controller brushes to each motor will first pass to the left hand series of fixed brushes of reverser $RS^4$, thence to the right hand series of fixed brushes of reverser $RS^3$ and thence through or across reverser $RS^3$ to the left hand series of fixed brushes of reverser $RS^3$. If two cars are operated from the controller $C^2$, the course of the current to the motors of the first car will be the same as when the first car is operated singly from the controller $C^2$, and the course of the current to the motors of the second car will be the same as hereinbefore described except that the current will of course flow through the controller $C^2$ and will not flow to the reverser $RS^2$, the switching of the current to the individual motor circuits taking place at the right hand series of fixed brushes of the reverser $RS^4$.

The preferred embodiments of my invention hereinbefore described, while possessing features of specific novelty and attaining specific results of great value, also possess features of broad novelty that are capable of embodiment in systems of different specific construction and arrangement that might not be capable of effecting all the valuable results of which the specific embodiments herein set forth are capable. For example, it is possible, in either of the embodiments shown, to operate either car from the other; although it will be appreciated that if the trailing car were incapable of operating as the leading car, the capacity of operating the trailing car either as a unit or as a self-propelled trailer would be of great value. Further, it is possible, in either of the embodiments shown, to cause the current from the supply contact T to pass through the motors of both cars in the same manner at any given position of the controller of the forward car and to pass through the motors of the trailing car at all times in parallel with the motors of the leading car; and while the advantages of such a system are obvious, the invention is of course not limited to an arrangement of circuits whereby that result is secured. Again, the specific embodiments shown possess the advantage of enabling the motors of the rear car to be not only regulated, but also reversed, simultaneously with the motors of the forward car, by manipulating solely the controlling means of the forward car, this capacity being secured by initially moving the reversing switch of the rear car to a given position; and while this advantage is one of great value and importance, it is obvious that an embodiment of my invention that lacked this feature, while retaining the capacity possessed by my invention of enabling the motors of the rear car to be reversed by the coöperation of controlling devices on both cars, would possess a limited advantage, as it would enable the rear car to be self-propelled in both directions. Further, it will be understood that while I have applied the term "circuit coupling" to a set or group of terminal contacts connected independently to the contacts of the corresponding reversing switch, it is not intended to limit the invention, in its broadest aspect, to the employment of groups of terminal contacts except where the same are specifically claimed; although this feature is one, specifically considered, of the highest importance, being of especial value as a factor in securing the valuable result of enabling the controlling means—e. g. controller or regulator C and reverser RS'—of one car to reverse the current through the motors of the other car without manipulating any of the controlling means on the rear car; this feature also being of great value as a factor in permitting the motor or motors of the second car to be operated in the same manner at any given position of the controller of the first car and in permitting a plurality of motors on the second car to be shifted from series to multiple relation with each other by the manipulation of the controller of the first car.

Having now fully described my invention, what I claim and desire to protect by Letters Patent is:—

1. In an electric railway system, the combination with a controller and the motor or motors, of a circuit coupling, connections from the controller, connections to the circuit coupling, connections to the motors, and means either to connect the controller connections with both the motor connections and the circuit coupling, or to connect the motor connections with the circuit coupling, thereby permitting both the motors of said car and the motors of another car coupled thereto to be regulated by the controller of the first car, or the motors of the first car to be regulated by the controller of the second car.

2. In an electric railway system, the combination with a controller and the motor or motors, of a group of terminal contacts, connections from the controller, connections to the several terminal contacts of the group, connections to the motors, and means either to connect the controller connections with both the motor connections and the terminal contact connections or to connect the motor connections with the terminal contact connections.

3. In an electric railway system, the combination with a controller and the motor or motors, of a circuit coupling, connections from the controller, connections from the circuit coupling, connections to the motor or motors, and a switch adapted to connect both the controller connections and the circuit coupling connections with the motor or motors, said switch including means permitting current received either from the controller or from the circuit coupling to pass in either direction through the motor or motors.

4. In an electric railway system, the combination with a controller and the motor or motors, of a set of terminal contacts, and a switch and conductors adapted to connect both the controller and the terminal contacts with the motor or motors, said switch including means permitting current received either from the controller or from the terminal contacts to be reversed in the motor or motors.

5. In an electric railway system, the combination with a controller and the motor or motors, of a circuit coupling, and means either to connect with said controller the motors and circuit coupling in parallel with each other, or to connect the circuit coupling with the motors independently of the controller.

6. In an electric railway system, the combination with a controller and the motor or motors, of a set of terminal contacts, independent conductors connected respectively with the several contacts, and means either to connect with said controller the motors and terminal conductors in parallel with each other, or to connect the terminal conductors with the motors independently of the controller.

7. In an electric railway system, the combination with a controller and the motor or motors, of a circuit coupling, connections from the controller, connections to the circuit coupling, connections to the motors, and a reversing switch adapted in one position to connect the controller connections with both the motor connections and the circuit coupling connections and in another position to connect the motor connections with the circuit coupling connections.

8. In an electric railway system, the combination with a controller and the motor or motors, of a group of terminal contacts, connections from the controller, connections to the several terminal contacts of the group, connections to the motors, and a reversing switch adapted in one position to connect the controller connections with both the motor connections and the several terminal contact connections and in another position to connect the motor connections with the several terminal contact connections.

9. In an electric railway system, the combination with two controllers, one at each end of the car, and the motor or motors, of a circuit coupling, connections from both controllers, connections to the circuit coupling, connections to the motors, and means either to connect the connections from either controller with both the motor connections and the circuit coupling connections, or to connect the motor connections with the circuit coupling connections, thereby permitting the motors to be regulated by either controller or by the current admitted through the contact terminals.

10. In an electric railway system, the combination with two controllers, one at each end of the car, and the motor or motors, of a group of terminal contacts, connections from both controllers, connections to the several terminal contacts, connections to the motors, and means either to connect the connections from either controller with both the motor connections and the several terminal contact connections, or to connect the motor connections with the several terminal contact connections.

11. In an electric railway system, the combination with the controller and the motor or motors, of terminal contacts, two sets of brushes electrically connected in parallel with each other by the controller, brushes electrically connected with the motors, brushes electrically connected with the terminal contacts, and means adapted either to connect one of the first two sets of brushes with the motor-connected brushes and also to connect the second of the first two sets of brushes with the terminal-contact-connected brushes, or to connect the motor-connected brushes respectively with the terminal-contact-connected brushes.

12. In an electric railway system, the combination with a controller and the motor or motors, of connections from the controller, connections to the motors, a set of terminal contacts, brushes corresponding in number to the terminal contacts and respectively connected thereto, and means either to connect the controller connections with both the motor connections and said brushes, or to connect the motor connections with said brushes, thereby permitting both the motors of said car and the motors of a similar car coupled thereto to be regulated either by said controller, or the motors of the first car to be regulated by current admitted from the terminal contacts through said brushes.

13. In an electric railway system, the combination with a controller and the motor or motors, of a group of terminal contacts, connections from the controller, connections to the several terminal contacts, connections to the motors, brushes connected respectively to the several terminal contact connections, brushes connected with the controller connections, brushes connected with the motors, and means to interconnect said brushes to enable the motors to be controlled either from the controller or from current received through the terminal contacts.

14. In an electric railway system, the combination with a controller and the motor or motors, of a group of terminal contacts, connections from the controller, connections to the several terminal contacts, connections to the motors; and a reverser comprising brushes connected respectively to the several terminal contact connections, brushes connected with the controller connections, brushes connected with the motors, and a movable element adapted in either of two positions to connect the controller-connected brushes with both the motor-connected brushes and the terminal contact brushes, and in a third position to connect the motor-connected brushes with the terminal contact brushes.

15. In an electric railway system, the combination with two controllers, one at each end of the car, and the motor or motors, of terminal contacts, two sets of brushes at each end of the car electrically connected in parallel with each other by the corresponding controller, brushes at one end of the car electrically connected with the terminal contacts, brushes at the other end of the car electrically connected with the motors, two sets of brushes at opposite ends of the car cross-connected together, means at one end of the car adapted to connect the terminal-contact-connected brushes either with one of the corresponding controller-connected sets of brushes or with the corresponding cross-connected brushes, and means at the other end of the car adapted to connect the motor-connected brushes either with one of the corresponding controller-connected sets of brushes or with the corresponding cross-connected brushes.

16. In an electric railway system, the combination with a controller and the motor or motors, of a set of terminal contacts, two series of brushes, connections between certain of one series of brushes and the motors, connections between certain of the other series of brushes and the terminal contacts, connections between the controller and the remaining brushes of both series, and a movable switch adapted in one position to connect the brushes of the first series to complete the circuit through the motors and to connect the brushes of the second series to complete the circuit through the terminal contacts, and adapted in another position to connect brushes of one series with brushes of the other series.

17. In an electric railway system, the combination with a controller and the motor or motors, of a set of terminal contacts; a reverser comprising two series of fixed brushes and a movable element carrying two series of contacts adapted to respectively connect brushes of the two series when the rotatable element is in its off position and carrying also three series of contacts two of which are adapted to respectively engage the two series of brushes when the movable element is in its forward or reverse position; connections between the controller and both series of reverser brushes, connections between one series of reverser brushes and the motors, and connections between the other series of reverser brushes and the terminal contacts.

18. In an electric railway system, the combination with a controller and the motor or motors, of two sets of terminal contacts, conductors directly connecting respectively corresponding terminal contacts of the two sets; a reverser comprising two series of fixed brushes and a movable element carrying two series of contacts adapted to respectively connect brushes of the two series when the movable element is in its off position, and three series of contacts two of which are adapted to respectively engage the two series of brushes when the movable element is in its forward or reverse position; connections between the controller and both series of reverser brushes, connections between one series of reverser brushes and the motors, and connections between the other series of reverser brushes and the terminal contacts.

19. In an electric railway system, the combination with two controllers and the motor or motors, of two sets of terminal contacts, conductors directly connecting respectively corresponding terminal contacts of the two sets; and reversers, one for each controller, each comprising two series of fixed brushes and a movable element carrying two series of contacts adapted to respectively connect brushes of the two series when the movable element is in its off position and carrying also three series of contacts two of which are adapted to respectively engage the two series of brushes when the movable element is in its forward or reverse position; connections between each controller and both series of brushes of the corresponding reverser, connections between one series of brushes of one reverser and the motors, connections between one series of brushes of the other reverser and the terminal contacts, and connections from the second series of one reverser to the second series of the other reverser.

20. In an electric railway system, the combination with two controllers and the motor or motors, of a set of terminal contacts, two series of brushes at each end of the car, connections between each controller and certain of each adjacent series of brushes, connections between the remainder of one series of brushes at one end of the car and the remainder of one series of brushes at the other end of the car, connections between the motors and the remainder of the second series of brushes at one end of the car, connections between the terminal contacts and the remainder of the second series of brushes at the other end of the car, and movable switches, one for each two series of brushes, adapted in one position to connect brushes of one series with brushes of the other series, and adapted in another position to connect the corresponding controller with the motors or the terminal contacts.

21. In an electric car controlling system, the combination with two cars, of a motor or motors on each car, a circuit coupling on each car adapted to be connected with the circuit coupling on the other car, a contact on the forward car adapted to be connected with a source of current supply, conductors on the forward car connecting said supply contact with its circuit coupling, conductors on the rear car connecting its circuit coupling with its motor or motors, and manually operated controlling means on both cars interposed in their respective conductors and adapted to coöperate to enable the controlling means on the forward car to control the flow of the current from the supply contact on the forward car to the motor or motors of the rear car and reverse the direction of the current therethough.

22. In an eletric car controlling system, the combination with two cars, of a motor or motors on each car, a circuit coupling on each car adapted to be connected with the circuit coupling on the other car, a contact on the forward car adapted to be connected with a source of current supply, conductors on the forward car connecting said supply contact with its circuit coupling, conductors on the rear car connecting its circuit coupling with its motor or motors, and manually operated controlling means on both cars interposed in their respective conductors and adapted to coöperate to cause the current from said supply contact to flow through said circuit couplings and in either direction through the motor or motors of the rear car.

23. In an electric car-controlling system, the combination with two cars, of a motor or motors on each car, a circuit coupling on each car adapted to be connected with the circuit coupling on the other car, a contact on each car adapted to be connected with a source of current supply, conductors on each car connecting its supply contact with its circuit coupling and connecting its circuit coupling with its motor or motors, and manually operated controlling means on both cars interposed in their respective conductors and adapted to coöperate to enable the controlling means on either car to control the flow, and reverse the direction, of the current from the corresponding supply contact through the motor or motors of the other car.

24. In an electric car-controlling system, the combination with two cars, of a motor or motors on each car, a circuit coupling on each car adapted to be connected with the circuit coupling on the other car, a contact on each car adapted to be connected with a source of current supply, conductors on each car connecting its supply contact with its circuit coupling and connecting its circuit coupling with its motor or motors, and manually operated controlling means on both cars interposed in their respective conductors and adapted to coöperate to cause the current from either supply contact to flow through said circuit couplings and in either direction through the motor or motors of the other car.

25. In an electric car controlling system, the combination with two cars, of a motor or motors on each car, a circuit coupling on each car adapted to be connected with the circuit coupling on the other car, a contact on the front car adapted to be connected with a source of supply, conductors between said supply contact and the motor or motors and circuit coupling of the front car, conductors between the circuit coupling of the second car and its motor or motors, and controlling means on both cars adapted to coöperate to enable the controlling means on the forward car to reverse the direction of the current from the supply contact through the motor or motors of the second car.

26. In an electric car controlling system, the combination with two cars, of a motor or motors on each car, a circuit coupling on each car adapted to be connected with the circuit coupling on the other car, a contact on the front car adapted to be connected with a source of supply, conductors between said supply contact and the motor or motors and circuit coupling of the front car, conductors between the circuit coupling of the second car and its motor or motors, and controlling means on both cars adapted to coöperate to connect said supply contact with the motor or motors of the second car and enable the flow of current therethrough to be reversed.

27. In an electric railway system, the combination with two cars, of a motor or motors on each car, a controller on one car comprising a series of brushes and movable contacts, a group of terminal contacts on each car adapted to be respectively connected with the group of terminal contacts on the other car, connections from the controller brushes to the motors and to the several terminal contacts on the first car, and connections from the several terminal contacts of the second car to the motors of the second car.

28. In an electric railway system, the combination with two cars, of a motor or motors on each car, a controller on one car comprising a series of brushes and movable contacts, a group of terminal contacts on each car adapted to be respectively connected with the group of terminal contacts on the other car, connections from the controller brushes to the motors and to the several terminal contacts on the first car, connections from the several terminal contacts of the second car to the motors of the second car, and a reverser on the first car interposed in the electric connections of the first car and adapted to reverse the flow of current simultaneously through the motors of both cars.

In testimony of which invention, I have hereunto set my hand, at Philadelphia, on this 30th day of July, 1909.

ARTHUR B. STITZER.

Witnesses:
CHAS. T. MYERS,
J. R. CUSTER.